(12) United States Patent
Wende et al.

(10) Patent No.: US 9,030,557 B2
(45) Date of Patent: May 12, 2015

(54) CAMERA UNIT IN PARTICULAR FOR SURVEILLANCE IN A TRANSPORTATION MEANS

(75) Inventors: Gerko Wende, Hamburg (DE); Frank Niss, Hamburg (DE)

(73) Assignee: Lufthansa Technik AG, Hamburg (DE)

(*) Notice: Subject to any disclaimer, the term of this patent is extended or adjusted under 35 U.S.C. 154(b) by 962 days.

(21) Appl. No.: 13/069,658

(22) Filed: Mar. 23, 2011

(65) Prior Publication Data

US 2011/0234797 A1 Sep. 29, 2011

(30) Foreign Application Priority Data

Mar. 23, 2010 (DE) .......................... 10 2010 012 591

(51) Int. Cl.
*H04N 7/18* (2006.01)
*H04N 5/247* (2006.01)
*H04L 12/42* (2006.01)

(52) U.S. Cl.
CPC ................ *H04N 5/247* (2013.01); *H04L 12/42* (2013.01); *H04N 7/183* (2013.01)

(58) Field of Classification Search
CPC ......... H04L 12/42; H04N 5/247; H04N 7/183
USPC .......................... 348/144, 148, 150, 153, 156
See application file for complete search history.

(56) References Cited

U.S. PATENT DOCUMENTS

| 5,579,315 | A | 11/1996 | Lyu et al. | |
|---|---|---|---|---|
| 5,696,591 | A * | 12/1997 | Bilhorn et al. | 356/429 |
| 6,597,294 | B1 | 7/2003 | Ariens | |
| 6,824,317 | B2 * | 11/2004 | Finizio et al. | 396/427 |
| 7,028,202 | B2 * | 4/2006 | Long et al. | 713/340 |
| 7,657,330 | B2 * | 2/2010 | Morrison | 700/19 |
| 8,073,931 | B2 * | 12/2011 | Dawes et al. | 709/219 |
| 2003/0142745 | A1 * | 7/2003 | Osawa | 375/240.03 |
| 2004/0175123 | A1 | 9/2004 | Lim et al. | |
| 2006/0268114 | A1 | 11/2006 | Chan et al. | |
| 2008/0239093 | A1 * | 10/2008 | Easwar et al. | 348/222.1 |
| 2009/0113494 | A1 | 4/2009 | Weidel | |
| 2010/0023865 | A1 * | 1/2010 | Fulker et al. | 715/734 |
| 2010/0081375 | A1 * | 4/2010 | Rosenblatt et al. | 455/41.1 |

FOREIGN PATENT DOCUMENTS

| CN | 1543194 | 11/2004 |
|---|---|---|
| DE | 195 02 114 | 10/1995 |
| DE | 101 48 054 A1 | 4/2003 |
| DE | 10 2005 018 316 A1 | 10/2006 |
| EP | 1 458 191 | 9/2004 |
| EP | 1632903 A1 | 8/2006 |
| WO | WO 2007 086822 A2 | 8/2007 |

* cited by examiner

*Primary Examiner* — Nhon Diep
(74) *Attorney, Agent, or Firm* — Saliwanchik, Lloyd & Eisenschenk

(57) ABSTRACT

A camera unit (12) in particular for surveillance in a transportation means (10) includes a digital camera (30), an electronic control device (32) for controlling and reading out the camera (30), and an interface (34) for outputting image data to a digital data network (16). The camera unit (12) comprises an active network component (36) for data distribution. The control device (32) is adapted to determine an individual identification from an identification means (40) which is provided at the mounting side at the installation point of the camera unit (12), and to determine at least one network parameter from the identification.

20 Claims, 2 Drawing Sheets

CAMERA UNIT IN PARTICULAR FOR SURVEILLANCE IN A TRANSPORTATION MEANS

Figure 1:
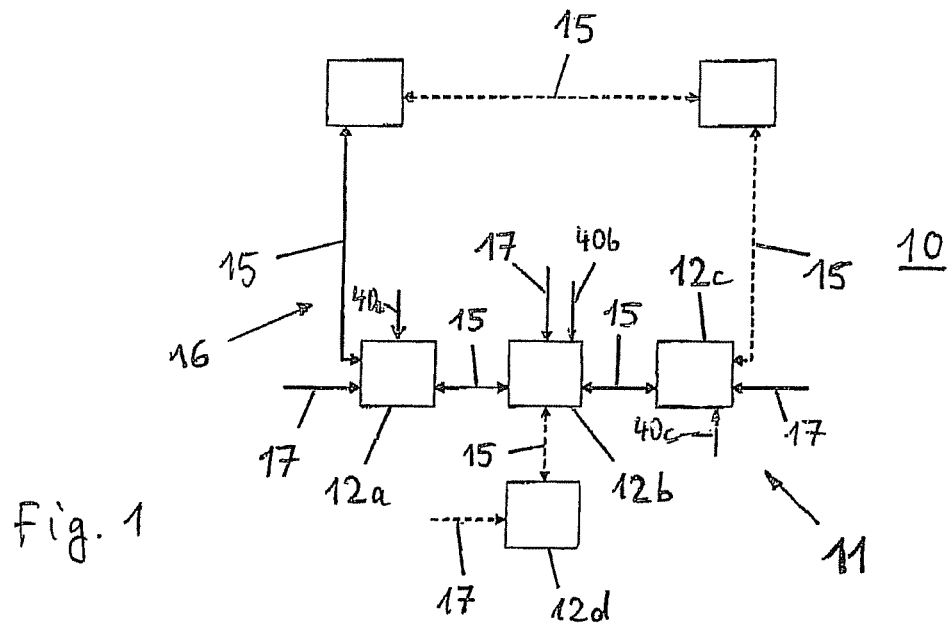

The invention relates to a camera unit in particular for surveillance in a transportation means, including a digital camera, an electronic control device for controlling and reading out the camera, and an interface for outputting image data to a digital data network.

A camera unit for the surveillance in an aircraft is known for example from DE 10 2005 018 316 A1. Camera units are used for example in a surveillance system according to DE 101 48 054 A1 for the surveillance of a safety zone between the passenger cabin and the cockpit of a passenger aircraft.

If the camera is a digital camera and image data are output to a digital data network, additional network components for data distribution and for providing and administrating corresponding network parameters, like for example IP addresses, are needed. This can be realized for example via a separate Ethernet switch, see US 2009 113494 A1. However, additional active network components, on the one hand, require installation space and an additional power supply, and, on the other hand, involve additional installation effort and configuration effort. Furthermore, the individual identification of individual camera units of the network must be entered manually via corresponding hardware configuration and/or software configuration, whereby in particular during maintenance of such a system incorrect allocations of the camera units with respect to the respective mounting position may occur.

US 2004 175123 A1 discloses a network camera comprising an integrated hub.

US 2006 268114 A1 discloses a camera which is free of any interfaces allowing a direct connection of the camera to an external computer. The camera can only be connected to a specific external download device which, in turn, may be connected to a computer. The camera includes means for providing a camera identification code, for example in a read-only memory of a signal processor, an internal memory, a non-volatile memory like EEPROM or one-time PROM or a corresponding ID hardware circuit. The download device comprises means for reading out the camera identification code from a camera which is connected to the download device and for verifying the read out camera identification code with regard to predetermined criteria.

U.S. Pat. No. 6,597,294 B1 discloses an Electronic Flight Bag (EFB) comprising a computer which is located in a metal housing, a support arm which at one end is mounted in the metal housing, and at the other end of which a monitor is located, which is connected to the computer, and a closed-circuit video camera which is connected to an interface of the computer to allow surveillance for example of the cockpit door in the cockpit.

WO 2007 086822 A2 and EP 1 632 903 A1 disclose further surveillance systems for the surveillance in a transportation means.

It is the object of the invention to provide a camera unit which involves a reduction of the installation space and of the overall installation effort and configuration effort, and which preferably allows a simple and quick installation and maintenance.

The invention solves this object with the means of independent claim 1. Owing to the integration of an active network component for data distribution, preferably of a switch, into the camera unit, corresponding separate network components can be avoided. The functions carried out by the active network component, in particular data distribution, preferably also providing and administrating corresponding network parameters, can essentially be carried out in the camera unit which is equipped according to the invention without additional installation space and without additional power supply.

According to the invention, the control device is adapted to determine an individual identification from an identification means which is provided at the mounting side at the installation point of the camera unit. At the installation point means that the identification means which is allocated to a camera unit has a direct spatial relation to this camera unit or is located decentrally. Moreover, there is a measuring connection or an operative connection between the identification means and the camera unit allowing the control device to read out or to determine the identification from the identification means. The identification in particular can contain information with respect to the mounting position of the camera arrangement. Thus, the position information is available at the installation point at any time after installation of the identification means at the installation point and can be determined automatically by the control device after mounting a camera unit at this installation point without any individual configuration or individual programming.

According to the invention, a network parameter specifying the camera unit, in particular an IP address, can be determined from the identification. Therefore, an error-sensitive manual allocation of an identification or of a network parameter after mounting or replacing a camera unit, for example in consequence of a defect in a camera unit, is no longer necessary. Installation and maintenance of camera units are significantly facilitated and expedited thereby.

The identification means is preferably formed in an electric plug means which is to be connected to the respective camera unit, preferably in the form of an individual coding of contact elements of the plug means, like for example contact pins. Besides the contact elements used for the identification, essentially no further means are needed then. However, the identification means is not limited to a coding of contact elements of a plug means at the mounting side. The identification means may also be for example a transponder or another electrically or mechanically coded, preferably passive element which can also be independent of an electric plug means which is to be connected to the respective camera unit.

The camera unit preferably includes a plurality of network interfaces, further preferably at least three network interfaces. Thereby, different expedient network topologies, if desired comprising further camera units for example for other cabin sections or for the cargo compartments, can be realized in a surveillance system.

In an advantageous embodiment, the invention relates to a surveillance system, preferably for surveillance in a transportation means, in particular for cockpit door surveillance in a passenger aircraft, including a camera unit according to the invention and at least one monitor device which is connected to the camera unit via a network connection for displaying images recorded by the camera unit. The at least one monitor device then is preferably formed by an Electronic Flight Bag (EFB). By using the monitor which is already provided in the EFB, an additional monitor for the surveillance system can be dispensed with, resulting in significant additional effort and installation space being saved in the cockpit.

Preferably, a plurality of monitor devices is provided. The at least one camera unit and the plurality of monitor devices can advantageously be connected to each other via a ring type network structure. Hereby, in particular a redundancy can be generated still allowing a nearly unhindered operation of the surveillance system even in the event of a single error of the network.

Figure 2:
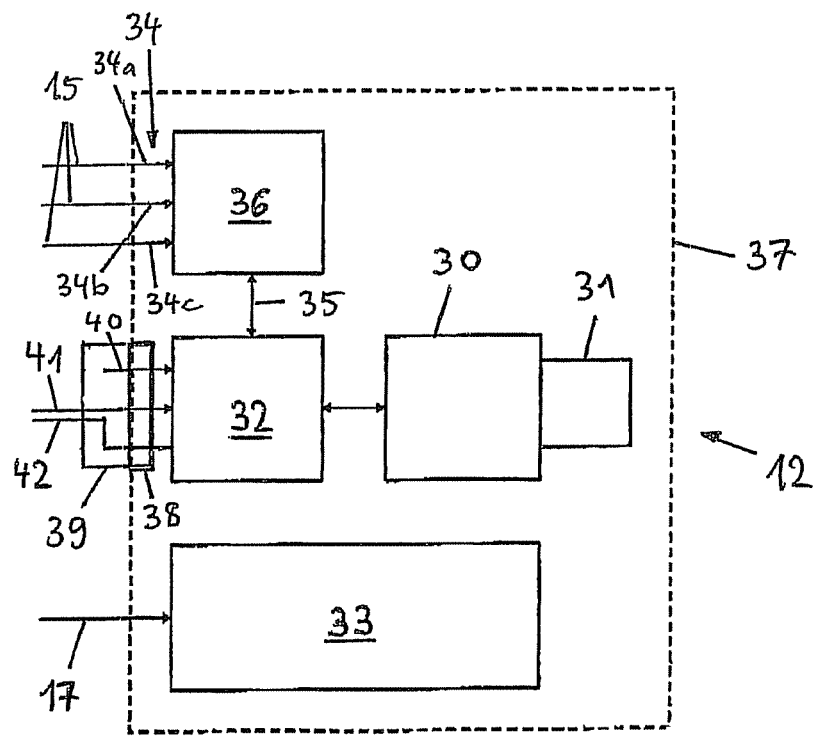
Figure 3:
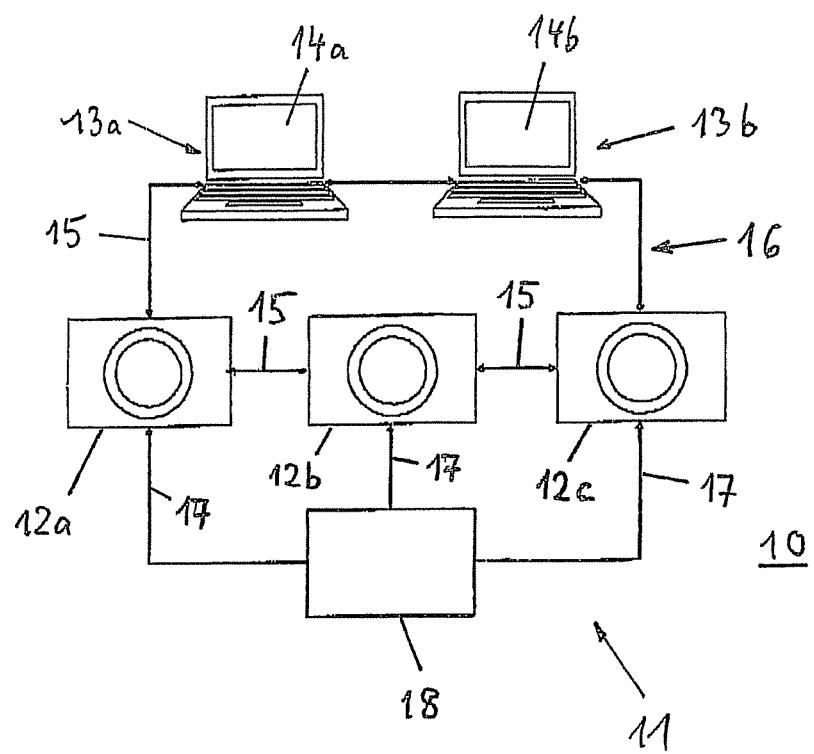

In the following, the invention is described in more detail on the basis of advantageous embodiments with reference to the attached figures. The figures show:

FIG. 1: a surveillance system in particular for the surveillance in a transportation means;

FIG. 2: a schematic illustration of a camera unit for a surveillance system; and FIG. 3: a surveillance system for cockpit door surveillance in a passenger aircraft.

In the following, the surveillance system 11 is described in more detail on the basis of a preferred application for the surveillance in particular of the cockpit door in a passenger aircraft 10. The invention can readily be applied to the surveillance in other transportation means, including aircrafts, ships, railway vehicles and motor vehicles. Further applications are possible, for example surveillance of sites, plants and buildings.

The surveillance system 11 includes at least one digital camera unit 12a and a monitor device 13a which is connected to the camera unit via a digital data line 15 and comprises a monitor 14a for displaying images recorded by the camera unit 12a, see FIG. 3. The at least one camera unit 12a and the at least one monitor device 13a are part of a digital data network 16, in particular of an Ethernet network. The monitor device 13a is preferably formed by an Electronic Flight Bag (EFB) in the cockpit, so that a conventional separate monitor for the surveillance system 11 can be dispensed with.

To allow an overall surveillance in particular of the space in front of the cockpit door, the surveillance system 11 preferably includes a plurality of at least two, preferably at least three camera units 12a, 12b, 12c which expediently are connected, in particular serially, to each other and to the at least one monitor device 13a via digital data lines 15.

The surveillance system 11 preferably includes a plurality of monitor devices 13a, 13b comprising corresponding monitors 14a, 14b, in order to enable several persons, for example pilot and co-pilot, to view the images recorded by the at least one camera unit 12a, 12b, 12c independently. The monitor devices 13a, 13b, and the camera units 12a, 12b, 12c are preferably connected in a ring type network arrangement 16 via data lines 15, as is shown in FIGS. 1 and 3. Owing to the redundancy generated thereby, a nearly unhindered operation of the surveillance system 11 can still be maintained even in the event of a single error in the network 16. The network 16 may also comprise branches, for example in FIG. 1, for connecting a further camera unit 12d.

In FIG. 2, a camera unit 12 is illustrated in more detail and includes a camera 30 comprising a lens 31, a processing unit 32 for controlling the camera 30 and processing the image data recorded by the camera 30, an internal power supply device 33 which is supplied via a supply line 17 with a supply voltage from a power source 18 (see FIG. 3), at least one digital data interface 34 for outputting the image data recorded by the camera unit 12 to the data network, and a housing 37. In view of the preferred ring type network 16, at least two data interfaces 34a, 34b are preferably provided. At least one further data interface 34c may be provided for connecting a further camera unit 12d. Generally, different network structures (ring, star, tree and/or combinations thereof, etc.) can be realized with at least three data interfaces 34a, 34b, 34c.

The distribution of the data traffic between the network interfaces 34a, 34b, 34c and the internal data interface 35 is preferably controlled via a switch 36, in particular an Ethernet switch, which is located in the camera unit 12 and is expediently supplied by the power supply device 33. Therefore, additional network components for data distribution in the surveillance system 11 can preferably be dispensed with. Ethernet switches are available in particular as single-chip components in different designs.

The camera unit 12 includes an electric plug connection comprising a plug means 38, for example a receptacle, at the camera side, and a plug means 39, for example a plug connector, at the mounting side, which works together with said plug means at the camera side. The plug means 39 at the mounting side is not part of the camera unit 12, but is part of the part of the surveillance system 11, which is fixedly installed in the aircraft. The plug means 39 at the mounting side in particular includes an identification means 40 which is described in more detail below. The plug connection 38, 39 may further serve to connect the data lines 15, the supply line 17 and/or further lines, if desired, for example an additional input line 41 and an additional output line 42, to the camera unit 12.

The identification means 40 serves to code a distinct identification which in particular defines the installation point of the respective camera unit 12a, 12b, 12c in the surveillance system. More precisely, every camera unit 12a, 12b, 12c receives an individual identification by individually allocating a corresponding identification means 40a, 40b, 40c comprising an individual identification. When the plug means 38 of a camera unit 12 is connected to the plug means 39 at the mounting side, the identification code contained in the identification means 40 can be read out by the processing unit 32 and the installation point and/or network parameters, in particular an IP address of the camera unit 12, can be determined from said code. Therefore, there is no need for a manual allocation of network parameters or an IP address to the camera unit 12. The information relating to the installation point of the camera unit 12 is automatically provided via the identification means 40 by simply connecting the plug means 38 to the plug means 39; thus, an incorrect allocation of a camera unit 12a, 12b, 12c in the at least one terminal 13a, 13b is practically impossible.

The identification means 40 is preferably realized by coding contact elements, in particular contact pins, in the plug means 39. A coding can be carried out in a simple way by applying for example either a predefined voltage or a predefined mass to the contact pins which are intended to be coded. When the identification means 40 includes for example four contact pins for coding the identification, sixteen individual identifications can be coded that way. Of course, a coding of individual identifications can also be obtained in another suitable way.

What is claimed is:

1. An apparatus comprising:
a camera unit, wherein the camera unit comprises:
a digital camera,
an electronic control device, wherein the electronic control device controls the digital camera, wherein the electronic control device reads the image data recorded by the digital camera, and
a network interface, wherein the network interface is configured to output the image data recorded by the digital camera to a digital data network,
an internal data interface, and
an active network component, wherein the active network component is connected to the electronic control device via the internal data interface, wherein the active network component controls distribution of data between the network interface and the internal data interface, wherein the camera unit is configured to be installed at a mounting position such that when the camera unit is installed at the mounting position there is an operative connection between the camera unit and an identification mechanism provided at the mounting position,
wherein the electronic control device is configured to determine an individual identification from the identification mechanism to which the camera unit is operatively connected when the camera unit is installed at the mounting position, and to determine one or more network parameters from the individual identification.

2. The apparatus according to claim 1, wherein the active network component is a switch.

3. The apparatus according to claim 1, further comprising at least one additional network interface.

4. The apparatus according to claim 1, further comprising:
the identification mechanism, wherein the identification is configured to be provided at the mounting position, such that when the identification mechanism is provided at the moving position and the camera unit is installed at the mounting position, an operative connection between the camera unit and the identification mechanism, and the electronic control device determines the individual identification from the identification mechanism and determines one or more network parameters from the individual identification.

5. The apparatus according to claim 1, wherein the active network component is an Ethernet switch.

6. A surveillance system, comprising:
at least one camera unit;
a corresponding at least one identification mechanism, wherein the at least one identification mechanism is configured to be provided at a corresponding at least one mounting position; and
one or more monitor devices, wherein the one or more monitor devices are configured to connect to the at least one camera unit via a digital data network, wherein the one or more monitor devices are configured to receive image data recorded by the at least one camera unit from the at least one camera unit via the digital data network, wherein the one or more monitor devices are configured to display image data received from the at least one camera unit via the digital data network,
wherein each camera unit of the at least one camera unit comprises:
a digital camera,
an electronic control device, wherein the electronic control device controls the digital camera, wherein the electronic control device reads the image data recorded by the digital camera;
a network interface, wherein the network interface is configured to output image data recorded by the digital camera to the digital data network,
an internal data interface, and
an active network component, wherein the active network component is connected to the electronic control device via the internal data interface, wherein the active network component controls distribution of data between the network interface and the internal data interface,
wherein the at least one camera unit is configured to be installed at the at least one mounting position such that when the at least one camera unit is installed at the at least one mounting position there is a corresponding at least one operative connection between the at least one camera unit and the at least one identification mechanism,
wherein a corresponding at least one electronic control device of the at least one camera unit is configured to determine a corresponding at least one individual identification from the at least one identification mechanism to which the at least one camera unit is operatively connected when the at least one camera unit is installed at the at least one mounting position, and to determine a corresponding at least one one or more network parameter from the at least one individual identification.

7. The surveillance system according to claim 6,
wherein the at least one identification mechanism is formed in a corresponding at least one first portion of an electric plug mechanism,
wherein the at least one camera unit comprises a corresponding at least one second portion of the electric plug mechanism, wherein interconnection of a first portion of the electric plug mechanism of the at least one first portion of the electric plug mechanism with a second portion of the electric plug mechanism of the at least one second portion of the electric plug mechanism creates an operable connection between the corresponding identification mechanism and the corresponding camera unit,
wherein when the at least one camera unit is installed at the at least one mounting position the at least one first portion of the electric plug mechanism is connected to the at least one second portion of the electric plug mechanism of the at least one camera unit such that there is a corresponding at least one operative connection between the at least one identification mechanism formed in the at least one first portion of the electric plug mechanism and the at least one second portion of the electric plug mechanism.

8. The surveillance system according to claim 7, wherein the at least one identification mechanism is formed by a corresponding at least one coding of a corresponding at least one contact elements in the at least one first portion of the electric plug mechanism.

9. The surveillance system according to claim 6,
wherein the at least one identification mechanism comprises a corresponding at least one transponder.

10. A transportation vehicle, comprising:
a digital data network; and
a surveillance system, wherein the surveillance system comprises:
at least one camera unit;
a corresponding at least one identification mechanism, wherein the at least one identification mechanism is configured to be provided at a corresponding at least one mounting position; and
one or more monitor devices, wherein the one or more monitor devices are connected to the at least one camera unit via the digital data network, wherein the one or more monitor devices are configured to receive image data recorded by the at least one camera unit from the at least one camera unit via the digital data network, wherein the one or more monitor devices are configured to display image data received from the at least one camera unit via the digital data network,
wherein each camera unit of the at least one camera unit comprises:
a digital camera,
an electronic control device, wherein the electronic control device controls the digital camera, wherein the electronic control device reads image data recorded by the digital camera, a network interface, wherein the network interface is configured to output image data recorded by the digital camera to the digital data network via the network interface, an internal data interface, and an active network component, wherein the active network component is connected to the electronic control device via the internal data interface, wherein the active network component controls distribution of data between the network interface and the internal data interface, wherein the at least one camera unit is configured to be installed at the at least one mounting position such that when the at least one camera unit is installed at the at least one mounting position there is a corresponding at least one operative connection between the at least one camera unit and the at least one identification mechanism, wherein a corresponding at least one electronic control device of the at least one camera unit is configured to determine a corresponding at least one individual identification from the at least one identification mechanism to which the at least one camera unit is operatively connected when the at least one camera unit is installed at the at least one mounting position, and to determine a corresponding at least one one or more network parameter from the at least one individual identification.

11. The transportation vehicle according to claim 10, wherein the transportation vehicle is a passenger aircraft.

12. The transportation vehicle according to claim 10,
wherein the at least one identification mechanism is formed in a corresponding at least one first portion of an electric plug mechanism, wherein the at least one camera unit comprises a corresponding at least one second portion of the electric plug mechanism, wherein interconnection of a first portion of the electric plug mechanism of the at least one first portion of the electric plug mechanism with a second portion of the electric plug mechanism of the at least one second portion of the electric plug mechanism creates an operable connection between the corresponding identification mechanism and the corresponding camera unit, wherein when the at least one camera unit is installed at the at least one mounting position the at least one first portion of the electric plug mechanism is connected to the at least one second portion of the electric plug mechanism of the at least one camera unit such that there is a corresponding at least one operative connection between the at least one identification mechanism formed in the at least one first portion of the electric plug mechanism and the at least one second portion of the electric plug mechanism.

13. The transportation vehicle according to claim 12, wherein the at least one first portion of the electric plug mechanism is an at least one electric plug receptacle,
wherein the at least one first portion of the electric plug mechanism is an at least one electric plug connector.

14. The transportation vehicle according to claim 10,
wherein the at least one camera unit comprises at least two camera units,
wherein the at least one identification mechanism comprises a corresponding at least two identification mechanisms.

15. The transportation vehicle according to claim 10,
wherein the at least one identification mechanism comprises a corresponding at least one transponder.

16. The transportation vehicle according to claim 10, wherein the at least one identification mechanism is attached to the transportation vehicle at the at least one mounting position.

17. The transportation vehicle according to claim 10, wherein the at least one individual identification contains a corresponding at least one information with respect to a corresponding at least one mounting position.

18. The transportation vehicle according to claim 10,
wherein the transportation vehicle is a passenger aircraft having a cockpit door,
wherein a first identification mechanism of the at least one identification mechanism is provided at a first mounting position of the at least one mounting position,
wherein a first camera unit of the at least one camera unit is installed at the first mounting position such that there is a first operative connection between the first camera unit and the first identification mechanism,
wherein a first electronic control device of the first camera determines a corresponding first individual identification from the first identification mechanism and determines a first one or more network parameter from the first individual identification,
wherein the first camera unit outputs image data corresponding to a space in front of the cockpit door of the passenger aircraft.

19. The transportation vehicle according to claim 10, wherein the one or more monitor devices are formed by an Electronic Flight Bag (EFB).

20. The transportation vehicle according to claim 10, wherein the digital data network is a ring type digital data network.

* * * * *